｟United States Patent｠ [19]  [11] 3,783,872
King  [45] Jan. 8, 1974

[54] DISPOSABLE ABSORBENT PADS CONTAINING INSOLUBLE HYDROGELS

[75] Inventor: Paul A. King, Warwick, N.Y.

[73] Assignee: Union Carbide Corporation, New York, N.Y.

[22] Filed: June 23, 1969

[21] Appl. No.: 835,721

[52] U.S. Cl. ............................................ 128/290 R
[51] Int. Cl. .............................................. A61f 13/16
[58] Field of Search .................... 128/284, 287, 285, 128/290, 296, 156

[56] References Cited
UNITED STATES PATENTS

| | | | |
|---|---|---|---|
| 3,664,343 | 5/1972 | Assarsson | 128/290 R |
| 3,669,103 | 6/1972 | Harper et al. | 128/284 |
| 3,670,731 | 6/1972 | Harmon | 128/284 |
| 2,331,271 | 10/1943 | Gilchrist | 128/290 |
| 3,121,427 | 2/1964 | Mosier | 128/290 |
| 3,340,875 | 9/1967 | Dudley et al. | 128/290 |
| 3,344,789 | 10/1967 | Arnold et al. | 128/287 |
| 3,371,666 | 3/1968 | Lewing | 128/285 |
| 3,386,441 | 6/1968 | DeMerre | 128/285 |
| 3,419,006 | 12/1968 | King | 128/156 |

Primary Examiner—Charles F. Rosenbaum
Attorney—Paul A. Rose, Gerald R. O'Brien and William R. Moran

[57] ABSTRACT

Improved disposable absorbent articles, such as diapers, catamenial devices and sanitary napkins, are provided which contain certain insoluble hydrogels as an absorbing media.

9 Claims, No Drawings

DISPOSABLE ABSORBENT PADS CONTAINING INSOLUBLE HYDROGELS

This invention relates in general to improved disposable absorbent articles. In one aspect, this invention relates to articles having improved absorption properties. In a further aspect, this invention relates to disposable absorbent articles such as diapers, catamenial devices and sanitary napkins.

Although disposable absorbent articles for the absorption of body fluids have been in use for many years they have not always been completely staisfactory to the user. Numerous materials, variations in construction, and absorbents have all been reported in the literature. However, many products currently on the market suffer from the disadvantage of having poor or inferior absorption properties. In the past, the usual method employed to increase absorption characteristics was to add inexpensive materials which had high absorptive capacity such as fluffed wood pulp and the like contained between layers of moisture permeable fabrics. While satisfactory as absorbents for fluids, in many instances the article would be bulky and not comfortable. For example, diapers must have a minimum thickness to insure sufficient absorption of body fluids. If, however, the absorbing material has a low absorptive characteristic to be acceptable, the diaper would undoubtedly be bulky and not conform properly to the body contours.

Moreover, one of the major disadvantages of the products commercially available today, is that while they may have relatively high absorptive capacities, the absorbing media, if subjected to pressure, can release a portion of the absorbed liquid. This is due to the fact that the liquid is physically entrapped within a fibrous structure and a relative slight pressure is all that is needed to cause the absorbent media and the liquid to separate. This, of course, is highly undesirable, particularly in catamenial devices.

It is therefore an object of this invention to provide disposable absorbent articles wherein many of the previous disadvantages are eliminated or greatly reduced. It is a further object of this invention to provide an improved disposable absorbent article containing an insoluble hydrogel as an absorbing media. Another object of this invention is to provide a disposable absorbent article having improved absorption properties. A further object is to provide an absorbent article containing an insoluble hydrophilic polymer comprised of cross-linked poly-(alkylene oxide). A still further object is to provide an absorbent article containing cross-linked poly(ethylene oxide). These and other objects will readily become apparent to those skilled in the art in the light of the teachings herein set forth.

It its broad aspect, the disposable absorbent articles of this invention are comprised of, in combination, at least one absorbent pad and an essentially insoluble hydrophilic polymer.

In practice, the materials which have been found to be useful are transparent, insoluble hydrophilic polymers prepared from the following starting materials: poly(alkylene oxides), e.g. poly(ethylene oxide), polyvinyl alcohol, polyvinylmethyl ether, copolymers of maleic anhydride and ethylene, and copolymers of maleic anhydride and vinylmethyl ether.

Insoluble hydrophilic polymers especially amenable for use in the present invention because they possess the ability to incorporate very large amounts of water in the order of 25 to 100 times their dry weight include water insoluble poly(ethylene oxide), water insoluble copolymers of ethylene oxide and propylene oxide, and water insoluble alkyl substituted phenyl ethers of ethylene oxide polymers wherein the alkyl groups may be methyl and/or butyl. These polymers, in addition to possessing the ability to incorporate large amounts of water, are insoluble in water irrespective of temperature, will retain liquids, solutions and suspensions and will form gel-like products.

The water insoluble polymers mentioned immediately above may be conveniently prepared by utilizing ionizing radiation. As used herein, the term "ionizing radiation" includes that radiation which has sufficient energy to cause electronic excitation and/or ionization in the polymer molecules and solvent for example, when the irradiation is carried out with a high dose rate, in the absence of oxygen, or in solution where oxygen is rapidly used up, the formation of water insoluble polymeric materials useful in this invention takes place readily. The preferred method for producing the water insoluble polymers useful in this invention which have the highest water absorptive capacity is to carry out the irradiation on an aqueous solution of the polymer while employing ionizing radiation having an energy level in the range of about 0.50 mev. to about 20 mev. at a total dose of between about 0.05 and 10 megarads.

The terms "insoluble" or "insolubilization" as employed throughout the specification are utilized herein to define the formation of a gel which is essentially solid.

The insolubilization can be effected by a wide variety of methods and includes, but is not limited to, ionizing and non-ionizing radiation, and chemical cross-linking through covalent and ionic bonding.

In one preferred aspect, articles of this invention are comprised of at least one hydrophilic polymer of the formula:

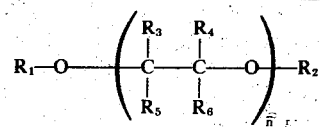

which has been cross-linked and wherein $R_1$ and $R_2$ are selected from the group consisting of hydrogen, alkyl radicals and alkyl substituted aryl radicals, and wherein $R_3$–$R_6$ are selected from the group consisting of hydrogen, methyl, phenyl and vinyl radicals, and $n$ is greater than one.

The hydrogels are polymeric compounds containing at least one of the structural units shown below:

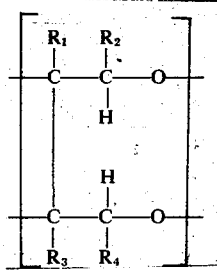

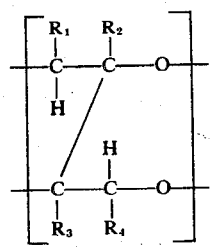

wherein $R_1$–$R_4$ are selected from the group consisting of hydrogen, methyl, phenyl and vinyl radicals.

These hydrophilic polymers may include carbon-to-carbon cross-linking between straight chain carbon atoms and the carbon atoms of branch chain methyl groups and in addition a very minor and insignificant number of bonds may include two oxygen atoms linking the carbon atoms.

The polymeric gel compounds may contain cross-linking bonds present as inter-molecular bonds (e.g. between two different molecules) and intramolecular bonds (e.g. between carbon atoms of the same molecule), and combinations of intra and intermolecular cross-linking bonds.

The preferred process for producing these polymeric gels comprises preparing a homogeneous water solution of at least one of the water soluble compounds selected from the following class of compounds:

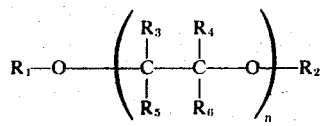

wherein $R_1$ and $R_2$ are selected from the group consisting of hydrogen, alkyl radicals and alkyl substituted aryl radicals, $R_3$–$R_6$ are selected from the group consisting of hydrogen, methyl, phenyl and vinyl radicals; and $n$ is greater than one; submitting the solution to ionizing radiation for a period of time sufficient to cause insolubilization of the polymer. The preferred starting materials for use in the devices of the present invention are ethylene oxide polymers which have a reduced viscosity value of at least 0.5 and upwards to 75, and higher; or an aqueous viscosity at 25° C. of from 225 centipoises, as measured at a 5 weight per cent concentration, to 12,000 centipoises, and higher, as measured at a 1 weight per cent solution. The polymers which are particularly useful are the ethylene oxide homopolymers and ethylene oxide copolymers, terpolymers and the like, comprised of at least 50 weight per cent of ethylene oxide in copolymerized form with up to 50 weight per cent of at least one other lower olefin oxide such as propylene oxide, butylene oxide, styrene oxide, and the like.

The reduced viscosity is measured by the following method: Transfer 100 ml of acetonitrile to an 8-oz., round, screw-cap bottle. With constant stirring introduce into the bottle, 0.200 gm of the polymer weighed to the nearest mg. Line the screw-cap of the bottle with a piece of aluminum foil, carefully place the cap on the bottle, and tighten securely. Place the bottle on a suitable can roller with 6-inch (I.D.) rollers, and allow it to roll for 16 ± 0.5 hr. Remove the bottle from the roller, and filter the solution by pressure through a coarse, sintered glass filter. Determine the time in seconds required for the sample solution to pass through a calibrated Ubbelohde suspended-level viscometer at 30 ± 0.01° C. Use a suitable stopwatch with a 10-second dial graduated in 0.1 second units, accurate to within 0.1 per cent when tested over a 60-minute period. Record the time required. Determine and record the time in seconds required for the acetonitrile to pass through the viscometer. Calculation $$AS - (F/AS) = AC$$

$$SS - (F/SS) = SC$$

$$SC - AC/AC = SV$$

$$SV/K = RV$$

F = viscometer correction
AS = seconds, required for acetonitrile
AC = seconds, corrected, required for the acetonitrile
SS = seconds, required for polymer solution
SC = seconds, corrected, required for solution
SV = specific viscosity
RV = reduced viscosity
K = concentration, gm sample per 100 ml acetonitrile The following table illustrates the relation between the average molecular weight of poly(ethylene oxide), reduced viscosity and bulk viscosity of solutions thereof.

| Wt.-% polymer in acetonitrile | Reduced Viscosity | Approximate Average molecular weight | Bulk viscosity aqueous solution at 25°C. |
|---|---|---|---|
| 0.2 | 1.5 | 150,000 | 200 cps (5 wt. % soln.) |
| 0.2 | 60 | 10,000,000 | 7000–9000 cps (1 wt. % soln.) |

The terms "aqueous viscosity" or "bulk viscosity" as employed herein refer to the viscosity of the stated concentration of polymer in water, as measured on a Model RVF Brookfield Viscometer using a No. 1 spindle operated at 2 revolutions per minute, unless otherwise stated. The viscosity is measured at ambient room temperatures, that is, about 24° C.

In general, the aforementioned hydrogels are useful for increasing the absorbency of any known or commercially available disposable, article. For example, the hydrogels can be incorporated into diapers of the type disclosed in U.S. Pat. Nos. 2,788,003; 2,860,637; 3,306,293; 2,667,168. Similarly, they can be incorporated into tampons or sanitary napkins of the type disclosed in U.S. Pat. Nos. 3,121,427; 3,070,095 and the like. As indicated in the examples, the hydrogels can be employed in a wide variety of ways, such as, for example, as a powder dispersed in and bonded to a cellulosic or similar substrate, or as a film of the hydrogel sandwiched between layers of the supporting structure. Any of the several known methods can be employed to affix the film or powdered hydrogel to the substrate.

In general, the amount of hydrophilic polymer employed will be dependent upon the particular absorbent article and its intended use. In practice, it has been observed that disposable absorbent articles can be prepared containing from about 2 to about 98 weight per cent.

The following standardized experimental procedure was employed to evaluate the absorbent articles of this invention.

A hydrophilic water-insoluble poly(ethylene oxide) polymer was prepared by cross-linking a 4 weight per cent aqueous solution of a poly(ethylene oxide) homopolymer having a reduced viscosity of about 60. The cross-linking was effected by a Van de Graaf accelerator having an electron beam intensity of about 1 million MeV to a total dose of from about one-half to about 2 megarads. The insoluble polymer was prepared in the form of a 3-inch wide tape weighing about 28 grams per linear foot (weight includes the water from the aqueous solution). The tapes all had thin open structured gauze supports. The tapes produced as described above were then used to prepare vaginal tampons on a commercial tampon-making machine. The controls were prepared from layers of cotton felt 3 inches wide weighing 12 grams per linear yard. The experimental tampons employing the subject insoluble polymer tape were made by alternately layering the insoluble polymer tape and the cotton felt. The exact description of the layers used for each experiment in the series is shown below. The tampons were made by the standard commercial method. Briefly, the method comprises the following steps: A 1-yard strip comprising layers of cotton (for the controls) or layers of cotton and the insoluble polymer tape, is cut into pieces 1½ inches long (forming thereby pieces 1½ inches by 3 inches in dimension). The pieces are then stitched with a cotton string down the middle along the 3-inch dimension. The stitched piece is then compressed first transversely and then longitudinally into its final shape.

Three variations from the standard tampons were also evaluated. The first employed "slit tape." In this variation, the insoluble polymer tapes were slit longitudinally to form one-inch wide strips. The slit tape was then used in the same manner as the un-slit tape.

The second variation employed "perforated tape." One-quarter inch holes were punched in the tape three-quarters of an inch apart in the longitudinal direction and one-half inch apart in the transverse direction. The perforated tape thus formed had transverse rows of four holes every three-quarters of an inch down the longitudinal direction. The perforated tape was then used in the same manner as the un-perforated tape.

The third variation was the use of "cut tampons." In this variation, the stitched pieces were cut with 8 half-inch slits disposed transversely, four to a side, between the stitching and the edge of the piece.

Two series of tampons were prepared; one was "regular" size and the other was "super" size.

SERIES I

The number of layers of cotton or cotton plus insoluble polymer tape used in the several samples were as follows:

| Sample No. | Number of layers and description of their arrangement |
|---|---|
| 1-control | 3 layers of cotton |
| 2 | 1 layer of tape between two layers of cotton |
| 3 | 1 layer of slit tape between two layers of cotton |
| 4 | 2 layers of tape alternately between three layers of cotton |
| 5 | 2 layers of slit tape alternately between three layers of cotton |
| 6 | 2 adjacent layers of tape between two layers of cotton |

SERIES II

The number of layers of cotton or cotton plus insoluble polymer tape used in the several samples were as follows:

| Sample No. | Number of layers and description of their arrangement |
|---|---|
| 7-control | 4 layers of cotton |
| 8 | 1 layers of tape with 1 layer of cotton below and 2 layers of cotton above |
| 9 | same as sample 8 except that the perforated tape was employed |
| 10 | 2 layers of slit tape alternately between 3 layers of cotton |
| 11 | 2 layers of tape alternately between 3 layers of cotton |
| 12 | 2 layers of perforated tape alternately between 3 layers of cotton |
| 13 | 2 layers of slit tape alternately between 3 layers of cotton |
| 14 | cut tampon, 2 layers of tape between 3 layers of cotton |
| 15 | 3 layers of tape alternately between 4 layers of cotton. The two interior layers of cotton weight 6 grams per linear yard. |
| 16 | Same as Sample 15 except that perforated tape was used. |
| 17 | Same as Sample 15 except that slit tape was used. |
| 18 | Same as Sample 15 except that the tampon was cut. |

EVALUATION PROCEDURE

The tampons described above were tested for water-absorbing capacity. The evaluation procedure was as follows:

The tampons were placed between two pieces of flexible urethane foam having a bulk density of about 2 pounds per cubic foot. The two pieces of foam were each about five-eighths of an inch thick and the surface area of each piece that contacted the other piece was about 14 square inches. The bottom piece of foam was mounted on a piece of hard plastic that was inclined 40° down from the horizontal. The tampon to be tested was placed on upper surface the bottom piece of foam parallel to the longitudinal axis of the inclined surface (that is, parallel to the "fall line"). the top piece of foam is similarly bonded to a piece of hard plastic that has a platform that is horizontally disposed when the top piece of foam is placed on the bottom piece of foam. This platform is used to hold various weights to provide pressure on the tampon. The surfaces of the two pieces of foam that are in contact with each other and which surround the tampon being evaluated are covered with a piece of plastic film in order to prevent liquid from being absorbed by the foam.

Water was dripped onto the tampon that had been placed between the two pieces of foam. The water was dripped from a burette at a rate of about 1 cubic centimeter every 2 minutes until breakthrough occurred. The burette was then shut off for 4 to 5 minutes, and then the process was repeated 2 more times in order to saturate the tampon. The tables below display the results of these evaluation tests.

The tables display the weights that were placed on the platform, the dry weight of the tampon, the dry weight of the insoluble polymer tape, the wet weight of the tampon, the capacity of water of the tampon, and the per cent increase in capacity of the various experimental tampons compared with the controls. Three or four runs, using different weights on the platform, were made for each tampon.

TABLE I

| Weight on Platform pounds | Dry Weight Tampon grams | Dry Weight of Tape grams | Wet Weight Tampon grams | Capacity of Water of Tampon grams | % Increase over Control |
|---|---|---|---|---|---|
| Control 3 ply |  |  |  |  |  |
| Sample 1 |  |  |  |  |  |
| 1 | 2.23 | — | 8.63 | 2.87 | — |
| 4.2 | 2.07 | — | 8.03 | 2.88 | — |
| 8.2 | 2.40 | — | 9.36 | 2.90 | — |
| 12.5 | 2.10 | — | 7.80 | 2.71 | — |
| Sample 2 |  |  |  |  |  |
| 4.2 | 1.75 | 0.250 | 9.60 | 4.49 | 52.2 |
| 8.2 | 1.79 | 0.237 | 8.75 | 3.89 | 34.4 |
| 12.5 | 1.79 | 0.237 | 8.03 | 3.48 | 28.9 |
| Sample 3 |  |  |  |  |  |
| 4.2 | 1.81 | — | 11.42 | 5.31 | 80.0 |
| 8.2 | 1.84 | 0.258 | 8.38 | 3.55 | 22.4 |
| 12.5 | 1.73 | 0.246 | 8.99 | 4.20 | 55.6 |
| Sample 4 |  |  |  |  |  |
| 4.2 | 2.35 | 0.478 | 11.91 | 4.06 | 31.0 |
| 8.2 | 2.38 | 0.488 | 13.39 | 4.63 | 59.7 |
| 12.5 | 2.36 | 0.487 | 10.18 | 3.31 | 22.6 |
| Sample 5 |  |  |  |  |  |
| 4.2 | 2.33 | 0.481 | 12.44 | 4.34 | 47.2 |
| 8.2 | 2.34 | 0.459 | 11.06 | 3.73 | 38.1 |
| 12.5 | 2.31 | 0.455 | 12.73 | 4.51 | 55.6 |
| Sample 6 |  |  |  |  |  |
| 4.2 | 2.05 | 0.477 | 14.59 | 6.12 | 107.2 |
| 8.2 | 2.00 | 0.483 | 9.61 | 3.81 | 31.4 |
| 12.5 | 1.88 | 0.467 | 13.37 | 6.11 | 126.1 |

TABLE II

| Weight on Platform pounds | Dry Weight Tampons grams | Dry Weight of Tape grams | Wet Weight Tampon grams | Capacity of Water of Tampons grams | % Increase over Control |
|---|---|---|---|---|---|
| Control 4 ply |  |  |  |  |  |
| Sample 7 |  |  |  |  |  |
| 1.76 | 2.55 | — | 11.47 | 3.35 | — |
| 4.7 | 2.58 | — | 10.49 | 3.06 | — |
| 8.2 | 2.65 | — | 10.26 | 2.87 | — |
| 12.0 | 2.59 | — | 8.59 | 2.32 | — |
| Sample 8 |  |  |  |  |  |
| 1.7 | 2.21 | 0.189 | 12.85 | 4.84 | 144.5 |
| 3.0 | 2.29 | 0.227 | 11.44 | 4.00 | 25.0 |
| 4.2 | 2.23 | 0.223 | 10.87 | 3.88 | 25.2 |
| 8.2 | 1.88 | 0.218 | 9.41 | 4.00 | 42.9 |
| Sample 9 |  |  |  |  |  |
| 1.7 | 2.20 | 0.200 | 12.59 | 4.70 | 40.3 |
| 4.2 | 2.43 | 0.200 | 12.21 | 4.04 | 30.3 |
| 12.5 | 2.23 | 0.197 | 9.45 | 3.24 | 40.8 |
| Sample 10 |  |  |  |  |  |
| 4.2 | 2.33 | 0.212 | 10.67 | 3.58 | 15.5 |
| 12.5 | 2.37 | 0.220 | 9.65 | 3.07 | 33.5 |
| Sample 11 |  |  |  |  |  |
| 4.2 | 2.52 | 0.433 | 15.70 | 5.23 | 68.8 |
| 8.2 | 2.58 | 0.440 | 13.80 | 4.35 | 55.4 |
| 12.5 | 2.53 | 0.459 | 11.65 | 3.54 | 53.9 |
| Sample 12 |  |  |  |  |  |
| 3 | 2.50 | — | 17.30 | 5.92 | 83.8 |
| 8.2 | 2.46 | 0.407 | 13.30 | 4.41 | 57.5 |
| 12.5 | 2.48 | 0.410 | 10.26 | 3.14 | 36.5 |
| Sample 13 |  |  |  |  |  |
| 4.2 | 2.42 | 0.485 | 15.10 | 5.23 | 68.6 |
| 8.2 | 2.40 | 0.453 | 11.66 | 3.85 | 37.5 |
| 12.5 | 2.46 | 0.576 | 11.69 | 3.75 | 63.0 |
| Sample 14 |  |  |  |  |  |
| 4.2 | 2.37 | 0.444 | 15.99 | 5.74 | 85.2 |
| 8.2 | 2.45 | 0.454 | 14.02 | 4.71 | 68.2 |
| 12.5 | 2.17 | 0.416 | 11.31 | 4.21 | 83.0 |
| Sample 15 |  |  |  |  |  |
| 4.2 | 2.77 | 0.680 | 14.19 | 4.14 | 33.6 |
| 8.2 | 2.71 | 0.747 | 15.40 | 4.68 | 67.2 |
| 12.5 | 2.73 | 0.674 | 12.98 | 3.75 | 63.0 |
| Sample 16 |  |  |  |  |  |
| 4.2 | 2.67 | 0.579 | 15.16 | 4.68 | 51.0 |
| 8.2 | 2.67 | 0.585 | 13.65 | 4.11 | 46.8 |
| 12.5 | 2.77 | 0.618 | 12.12 | 3.37 | 46.5 |
| Sample 17 |  |  |  |  |  |
| 4.2 | 2.72 | 0.632 | 15.68 | 4.74 | 52.9 |
| 8.2 | 2.57 | 0.538 | 13.33 | 4.18 | 49.3 |
| 12.5 | 2.57 | 0.618 | 12.83 | 3.99 | 73.5 |
| Sample 18 |  |  |  |  |  |
| 4.2 | 2.73 | 0.666 | 15.66 | 4.75 | 53.2 |
| 8.2 | 2.71 | 0.659 | 14.71 | 4.43 | 58.2 |
| 12.5 | 2.65 | 0.693 | 12.45 | 3.70 | 60.9 |

What is claimed is:

1. A disposable absorbent article comprising in combination at least one absorbent pad and contained therein at least one hydrophilic polymer of the formula:

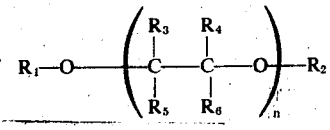

which has been cross-linked and which possess the ability to incorporate large amounts of water, and wherein $R_1$ and $R_2$ are selected from the group consisting of hydrogen, alkyl radicals and alkyl substituted aryl radicals, and wherein $R_3$–$R_6$ are selected from the group consisting of hydrogen, methyl, phenyl and vinyl radicals, and $n$ is greater than one.

2. The disposable absorbent article of claim 1 wherein said hydrophilic polymer is comprised of cross-linked poly(alkylene oxide).

3. The disposable absorbent article of claim 1 wherein said hydrophilic polymer is comprised of cross-linked poly(ethylene oxide).

4. A catamenial device containing therein the hydrophilic polymer as defined in claim 1.

5. A catamenial device containing therein cross-linked poly(ethylene oxide).

6. A sanitary napkin containing therein the hydrophilic polymer as defined in claim 1.

7. A sanitary napkin containing therein cross-linked poly(ethylene oxide).

8. A diaper containing therein the hydrophilic polymer as defined in claim 1.

9. A diaper containing therein cross-linked poly(ethylene oxide).

* * * * *